UNITED STATES PATENT OFFICE.

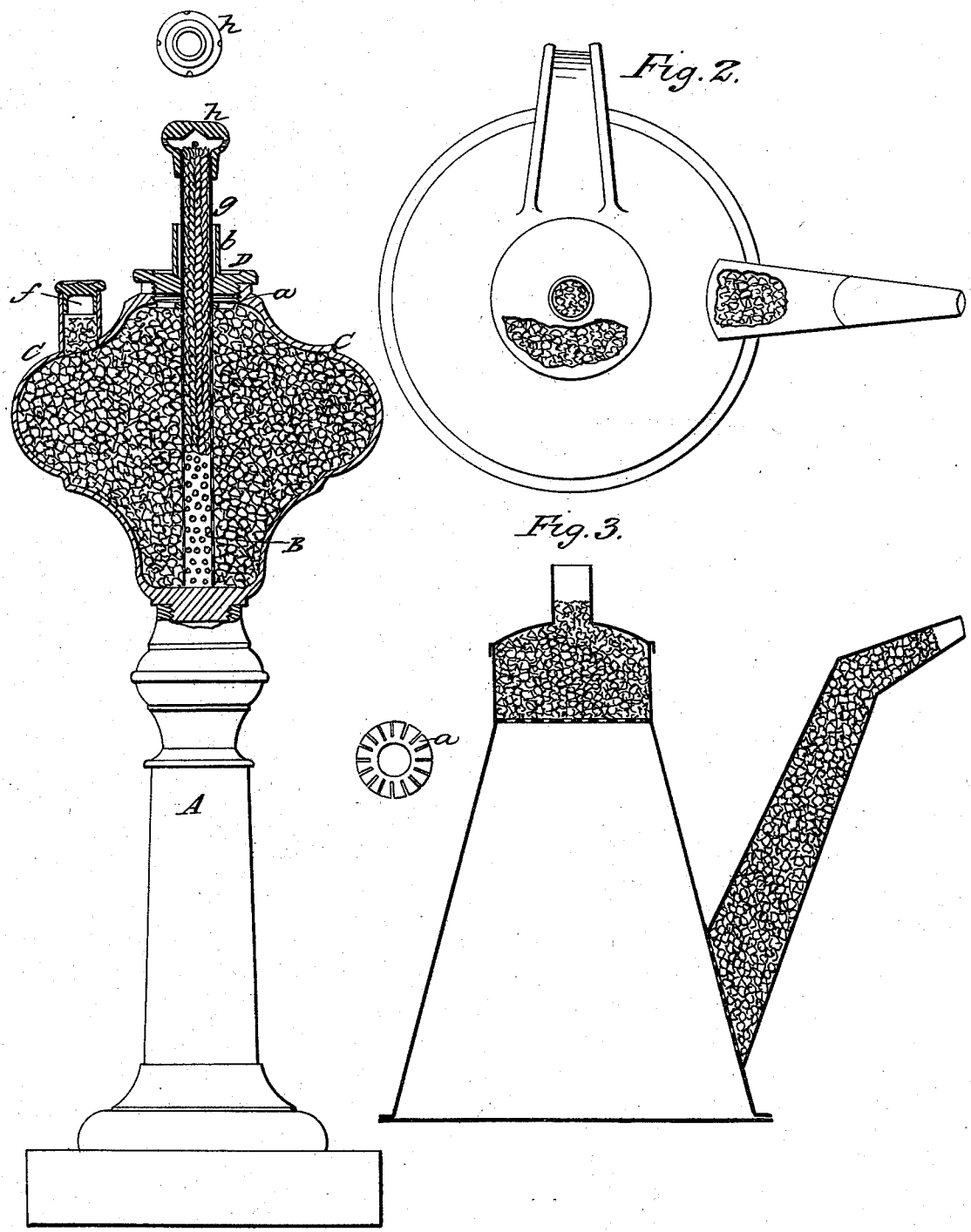

DEXTER H. CHAMBERLAIN, OF WEST ROXBURY, MASSACHUSETTS.

LAMP FOR BURNING FLUID.

Specification forming part of Letters Patent No. 12,814, dated May 8, 1855; Reissued March 19, 1867, No. 2,509.

*To all whom it may concern:*

Be it known that I, DEXTER H. CHAMBERLAIN, of West Roxbury, in the county of Norfolk and State of Massachusetts, have invented a new and useful Method of Obviating the Danger Attending the Use of Spirit-Gas and other Similar Inflammable and Explosive Burning Fluids, of which the following is a full, clear, and exact description, reference being had to the annexed drawings, making part of this specification, in which—

Figure 1 is a view of a lamp with my improvements attached to the upper part being shown in section. Figs. 2 and 3 will be referred to hereafter.

It has long been desirable to employ for illuminating purposes various hydrocarbons, and particularly a mixture of alcohol and camphene or turpentine, commonly known as spirit gas or burning fluid. The highly inflammable nature of these substances and their liability to explode when vaporized and mixed with air render their use extremely dangerous, and are the cause of many distressing accidents and deaths. On many accounts, however, particularly on the score of economy cleanliness and the brilliancy of the flame produced these spirituous fluids are preferable to the oils now commonly employed, and were it not for the above mentioned objections they would entirely supersede the latter for illuminating purposes in situations where gas was not attainable.

Numerous attempts have been made to remedy the above evils, but with very limited success;—some of the means adopted have proved successful under certain circumstances while they have totally failed under others, and none of them have succeeded in rendering the use of the fluids in question safe under all the circumstances to which the lamps may be exposed.

To accomplish this desired end and to render the use of these inflammable burning fluids entirely free from danger is the object of my present invention, which consists in filling the body of the lamp with a material which shall be capable of absorbing the fluid within its pores, and shall also discharge it freely as it is required to feed the flame. For this purpose I have tried a great variety of substances only one of which was found to answer the desired end. Sponge will absorb the fluid, but it will not again discharge it as it is wanted, and it soon becomes gummed up with the turpentine which separates and settles from the spirits and the sponge is rendered useless. Various granulated substances were also tried such as small shot which for various reasons that need not be here detailed have entirely failed to answer the purpose.

The material which I employ and which I have found to fulfil all the requirements is granulated pumice stone. This substance possesses peculiarities which particularly adapt it to the purpose. 1st. It freely absorbs the fluid within its pores. 2d. It as freely yields it up again when it is required. 3d. It will remain for any length of time within the fluid without being "gummed up" by the turpentine as is the case with any other substance with which I have experimented. 4th. The material itself is very light, the weight of the lamp not being sensibly increased thereby. 5th. The pumice stone is not corroded or otherwise affected by the burning fluid whereas the wire gauze and other metallic substances employed are speedily corroded and deteriorated by the turpentine in the fluid.

To enable others skilled in the art to understand my invention and to put it in practice I will proceed to describe the manner in which I have carried it out.

In the accompanying drawings A is the lamp the body being shown in section, to the bottom of the lamp is permanently soldered the tube B which is perforated with holes for the admission of the fluid into this tube is inserted the wick which is introduced from the top by means of a wire. Around this tube is packed the pumice stone C so as to fill the whole interior of the lamp as represented in the drawings. The pumice stone for this purpose is prepared by crushing and sifting through sieves of different fineness so as to leave the available portion of the size of the smallest shot. The lamp is then closed by the perforated plate *a* and the screw cap D, in the top of which is the cap or reservoir *b*, to contain a small quantity of alcohol for the purpose of starting the lamp when it is used as a gas lamp as will be hereafter explained. In lieu of the above arrangement, the tube B may pass directly through the top of the lamp which may be closed permanently around it, the lamp being filled through the opening $f$, but this forms no part of my invention and need not be further described.

The wick $g$ being introduced as before stated into the tube B by means of a wire, becomes saturated by the liquid within the tube, the heat from the flame warming and and vaporizing the fluid, by which means the brilliancy of the light is greatly increased. This warming of the fluid, which is so carefully to be guarded against in all other lamps for burning explosive inflammable compounds, is attended with no danger in my lamp.

Where the lamp is to be used as a gas lamp, the burner $h$ is fitted over the lamp tube B as seen in red in Fig. 1, and it is then ignited by burning a small quantity of alcohol in the reservoir $b$, which generates sufficient gas to ignite the flame, which then continues to burn as in other similarly arranged lamps.

A can or other vessel which may contain the fluid may be protected from danger should the lamp be filled while it is burning a portion of the spout of the feeder as well as the opening at the top of the can being packed with the granulated pumice stone which is confined in place by perforated disks or otherwise, Figs. 2 and 3. The lamp may thus be filled while burning without the least fear of accident either from gas within the canister or from the ignition of the fluid itself as the flame cannot pass down through the granulated pumice.

If an ordinary fluid lamp be filled with vaporized burning fluid, mixed with common air, and a flame be brought in contact with the mixture an explosion will take place. With a lamp prepared as above this can never occur as the flame will not descend beneath the surface of pumice. And should my lamp by any means be shattered in a manner which under ordinary circumstances would throw the fluid over the clothes of those near and endanger their lives, no such accident can happen as the fluid falls with the pumice, and is not thrown upon the person, but burns harmlessly and slowly upon the floor.

What I claim as my invention and desire to secure by Letters Patent is—

The employment of granulated pumice stone as a packing for spirit lamps and other vessels containing any inflammable hydrocarbon in the manner and for the purpose substantially as herein set forth.

DEXTER H. CHAMBERLAIN.

Witnesses:
SAM COOPER,
JOHN S. CLOW.

[FIRST PRINTED 1913.]